(12) United States Patent
Hansson et al.

(10) Patent No.: US 6,623,202 B2
(45) Date of Patent: Sep. 23, 2003

(54) TOOTHED TOOL COUPLING FOR ROTATING A ROTARY TOOL

(75) Inventors: Per Hansson, Güvle (SE); Sture Sjöö, Gävle (SE)

(73) Assignee: Sandvik AB, Sandviken (SE)

( * ) Notice: Subject to any disclaimer, the term of this patent is extended or adjusted under 35 U.S.C. 154(b) by 14 days.

(21) Appl. No.: 09/859,375

(22) Filed: May 18, 2001

(65) Prior Publication Data

US 2002/0003985 A1 Jan. 10, 2002

(30) Foreign Application Priority Data

May 18, 2000 (SE) .......................................... 0001825-9

(51) Int. Cl.[7] .............................................. B25G 3/28
(52) U.S. Cl. ................. 403/359.6; 403/359.1; 403/359.3; 403/257; 403/261; 464/182; 82/161
(58) Field of Search .................... 403/359.1–359.6, 403/256, 257, 261; 464/182; 82/160, 161

(56) References Cited

U.S. PATENT DOCUMENTS

| | | | | |
|---|---|---|---|---|
| 559,012 A | * | 4/1896 | Warren | 403/257 |
| 2,994,900 A | * | 8/1961 | Smithers | 15/250.34 |
| 3,210,892 A | * | 10/1965 | Perham | 451/342 |
| 3,584,667 A | | 6/1971 | Reiland | |
| 3,836,272 A | * | 9/1974 | Duer | 403/359 |
| 4,580,472 A | * | 4/1986 | Kastner | 82/37 |
| 5,660,494 A | * | 8/1997 | Schwarzler | 403/359 |

FOREIGN PATENT DOCUMENTS

| | | |
|---|---|---|
| DE | 3402547 | 8/1985 |
| JP | 58211020 | * 12/1983 |

OTHER PUBLICATIONS

U.S. patent application Ser. No. 09/859,379, filed May 18, 2001, Per Hansson et al., "Toothed Tool Coupling for Metal Cutting Devices".

* cited by examiner

*Primary Examiner*—Lynne H. Browne
*Assistant Examiner*—G M Collins
(74) *Attorney, Agent, or Firm*—Burns, Doane, Swecker & Mathis, LLP

(57) ABSTRACT

A driven tool includes a driven part which is rotatably driven by a drive part. The driven part and the drive part are coaxially arranged one inside of the other. The drive part and the driven part are conical as viewed in a longitudinal section plane containing the axis. The driven part includes driven teeth projecting generally radially with respect to the axis and received in respective radially-open recesses formed in the drive part. Each of the driven teeth makes contact with a wall of the respective recess at first and second contact places which are respectively situated on opposite sides of a generally radial line of symmetry of the driven tooth. The contact places are operable to transmit a drive force from the drive part to the driven part in respective directions of rotation. A driving angle in the range of −5° to +45° is formed at each contact place.

9 Claims, 5 Drawing Sheets

TOOTHED TOOL COUPLING FOR ROTATING A ROTARY TOOL

This application is based on and claims priority under 35 U.S.C. §119 with respect to Sweden Application No. 0001825-9 filed on May 18, 2000, the entire content of which is incorporated herein by reference.

TECHNICAL FIELD OF THE INVENTION

The present invention relates to a tool coupling, preferably for rotary tools, intended to rotate around an axis of rotation. The tool coupling serves to couple together a drive member and a tool body intended to carry cutting inserts for chip removing machining. The tool coupling comprises a toothed male part and a toothed female part, which parts are intended to be received one in the other.

PRIOR ART

A coupling element which can be coupled together with another member for the transmission of a rotation movement therebetween, wherein said coupling element may consist of a screw head, for example, is previously known from U.S. Pat. No. 3,584,667.

The coupling element according to U.S. Pat. No. 3,584,667 comprises a first series of spaced-apart, partially cylindrical convex surfaces and a second series of partially cylindrical concave surfaces alternating with the surfaces of the first series and connected tangentially thereto. The radius of curvature of the partially cylindrical concave surfaces included in the second series is considerably larger than the radius of curvature of the partially cylindrical convex surfaces included in the first series. Screws with screw heads formed as coupling elements according to U.S. Pat. No. 3,584,667 are marketed under the trademark TORX®. During the transmission of a rotational movement, a socket wrench having a corresponding, although inverted, design as the screw head is, for instance, used, said socket wrench being mated with the screw head. The so-called TORX® system enables transfer of high torques between socket wrench and screw head. The TORX® system also comprises screw heads having countersunk holes featuring the TORX® configuration.

A replaceable cutting body, i.e., a so-called loose top that is attached to a shaft is previously known from German Document 34 02 547. The connection between the cutting body and the shaft is formed in such a way that three radial grooves are provided in the end of the shaft facing the cutting body, while three radial ridges are arranged on the cutting body. In the active position of the connection, an axial fastening screw extends through the cutting body and into the shaft, the ridges being received in the grooves. Thereby, a torque may be transferred from the shaft to the cutting body. By virtue of a relatively flat inclination of the co-operating flanks of the grooves and the ridges, a relatively high axial force is required between the shaft and the cutting body in order to transfer torque of the magnitude desired from the shaft to the cutting body. The high axial force may lead to an elongation of the screw. Furthermore, it is difficult to define where abutment between the ridges and grooves will take place since the ridges and grooves have a linear extension.

Aims and Features of the Invention

A primary aim of the present invention is to provide a tool coupling of the kind defined in the introduction. The tool coupling being capable of transmitting large torques.

Another aim of the present invention is that also at a moderate axial pre-tension, there is an exceptionally small risk of failure of the transmission of torque.

Yet another aim of the present invention is that the tool coupling should he self-centering.

An additional aim of the present invention is that the tool coupling is free of play.

SUMMARY OF THE INVENTION

At least the primary aim of the present invention is realized by the combination of a driven tool and a drive member. The driven tool defines an axis of rotation and includes a body having at least one seat for receiving a cutting insert. A securing element secures the driven tool to the drive member. The drive member drives the tool about the axis of rotation. The driven tool includes a driven part rotatable about the axis, and the drive member includes a drive part rotatable about the axis and mated with the driven part to form a drive coupling therewith. The drive part and the driven part are conical as viewed in a longitudinal section plane containing the axis, and are arranged one inside of the other. The driven part includes driven teeth projecting generally radially with respect to the axis and received in respective radially-open recesses formed in the drive part. Each of the driven teeth terminates in an axially facing wall and includes a sidewall contacting a sidewall of the recess. A curvature of the tooth sidewall is different from a curvature of the recess sidewall at locations where those sidewalls contact one another. Accordingly, such contact is in the form of a point contact on each side of a generally radial line of symmetry of the respective tooth as viewed in a direction parallel to the axis. Each of the contact points is operable to transmit a drive fore from the drive part to the driven part in a respective direction of rotation. Each of the contact points defines a tangent line, wherein the drive force is transmitted along a line of force oriented perpendicular to a respective tangent line. A driving angle is formed between the line of symmetry and each tangent line. Each driving angle is in the range of −5° to +45°.

BRIEF DESCRIPTION OF THE DRAWINGS

Preferred embodiments of tool couplings according to the present invention will be described below, reference being made to the accompanying drawings, wherein.

DETAILED DESCRIPTION OF PREFERRED EMBODIMENTS OF THE INVENTION

Figure 1:
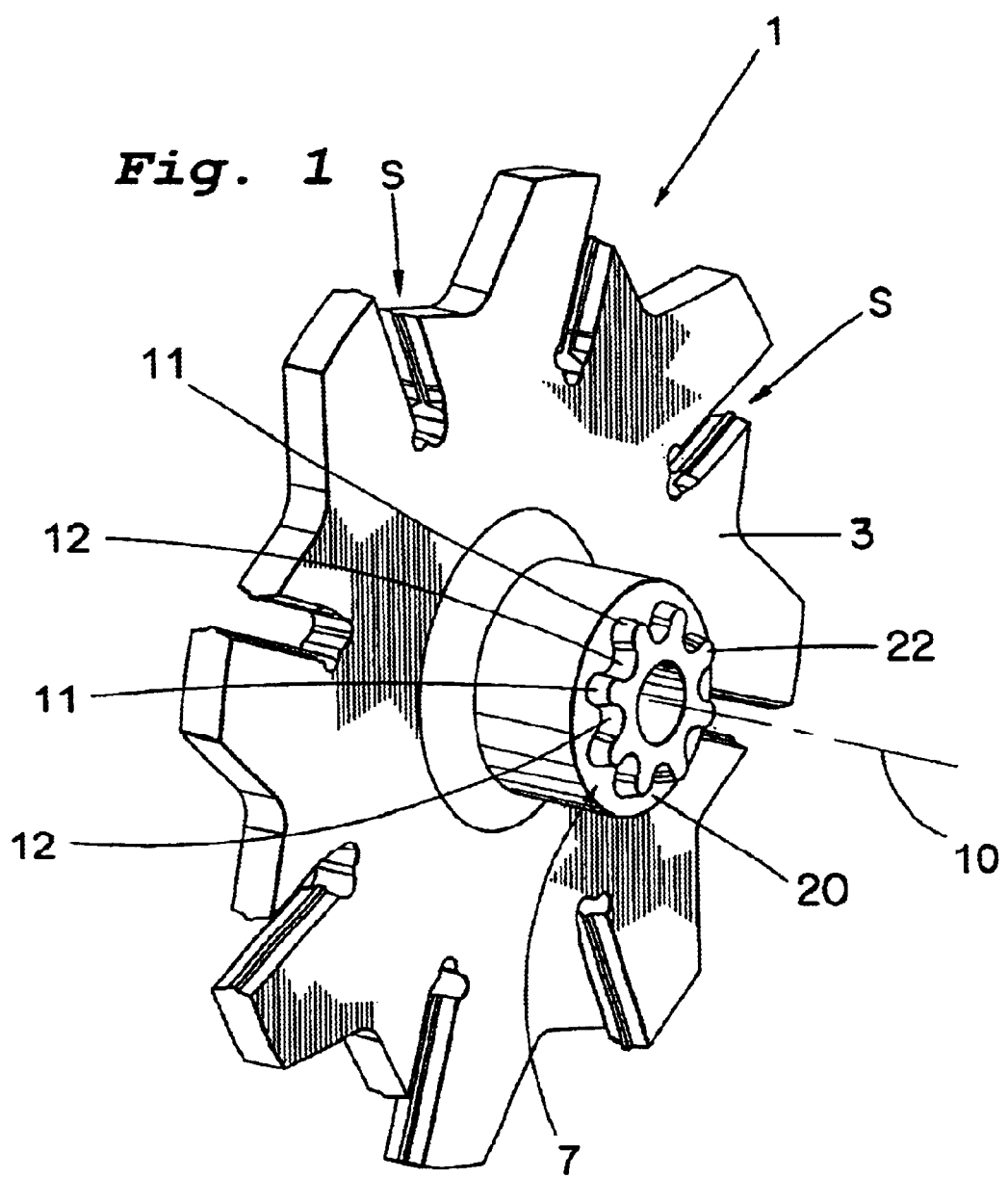
FIG. 1 shows a perspective rear view of a slitting cutter body, which is provided with a male part of a tool coupling according to the present invention.
Figure 2:
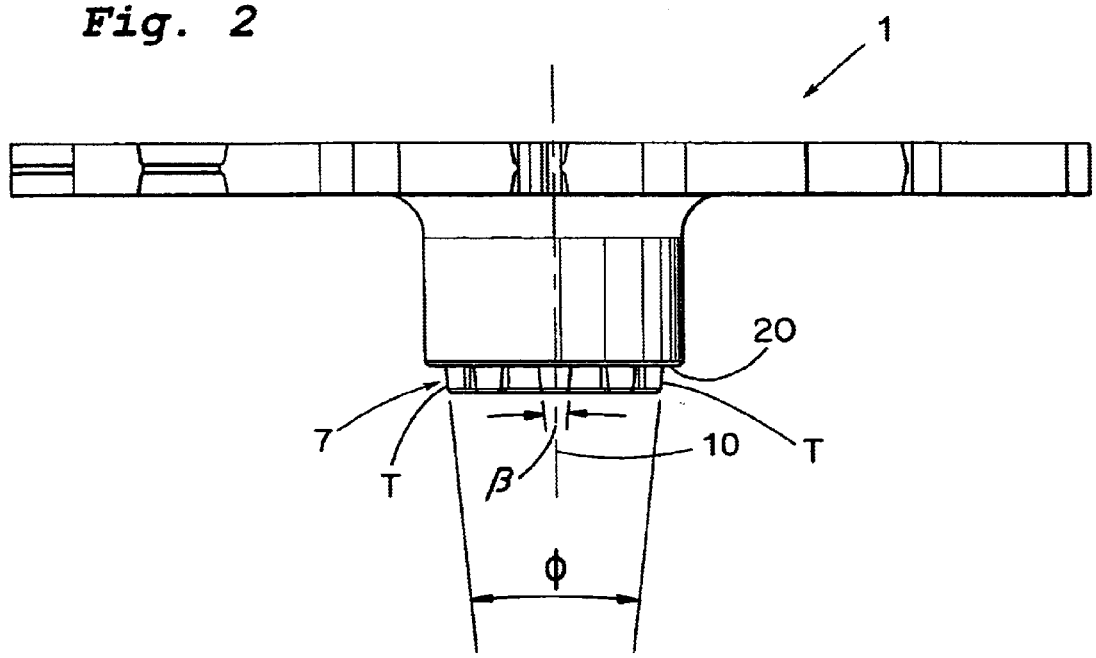
FIG. 2 shows a side view of the slitting cutter body according to FIG. 1.

The tool coupling according to the present invention illustrated in FIGS. 1–5 is arranged in connection with a first rotary tool 1 in the form of a slitting cutter. The slitting cutter which comprises an adaptor in the form of a slitting cutter body 3 having seats S for receiving metal cutting inserts. The slitting cutter body 3 and a drive shaft 5 are interconnected by means of a tool coupling according to the present invention. Said tool coupling comprises a male driven part 7 and a female driven part 9, the male part 7 shaped to be received in the female part and to cooperate therewith for the transmission of torque between the shaft 5 and the slitting cutter body 3. The parts 7, 9 have a common axis of rotation 10.

The male part 7, which is most clearly seen in FIG. 1, is disposed on an axially facing end surface 20 of the tool 1 and comprises a number of driven teeth 11, which are circumferentially spaced-apart from each other, and which form a tangent to an imaginary circle having its center lying on the axis of rotation 10. The driven teeth are directed away from said axis of rotation 10.

Figure 6:
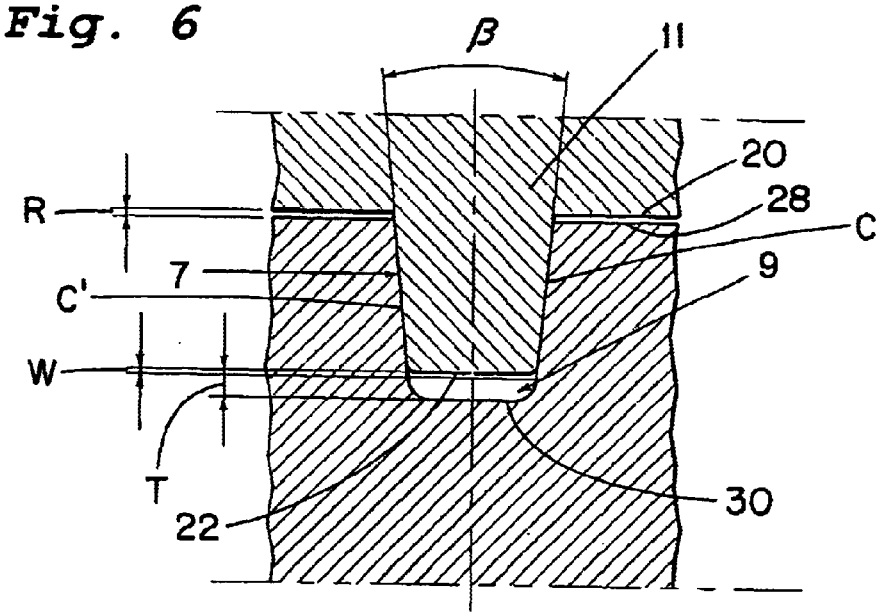
FIG. 6 shows a section taken along a longitudinal section plane A—A in FIG. 8 through a contact area between the male and female parts of the tool coupling in an assembled state thereof.

The teeth 11 are spaced-apart by a number of recesses 12, which also are spaced-apart from each other, and which form a tangent to an imaginary circle having its center lying on the axis of rotation 10. The recesses 12 are open in a direction away from said axis of rotation 10. As is most clearly seen in FIG. 2, the male part 7 has a slightly conical shape as viewed in a longitudinal section plane containing the axis of rotation, the conicity defined by a cone angle β (see FIG. 6). The cone angle β, see FIG. 6, is on the order of 1°–30°, preferably 2°–14°. In the center of the male part 7, a first cylindrical hole or recess 6 is provided whose center lies on the axis of rotation 10.

Figure 8:
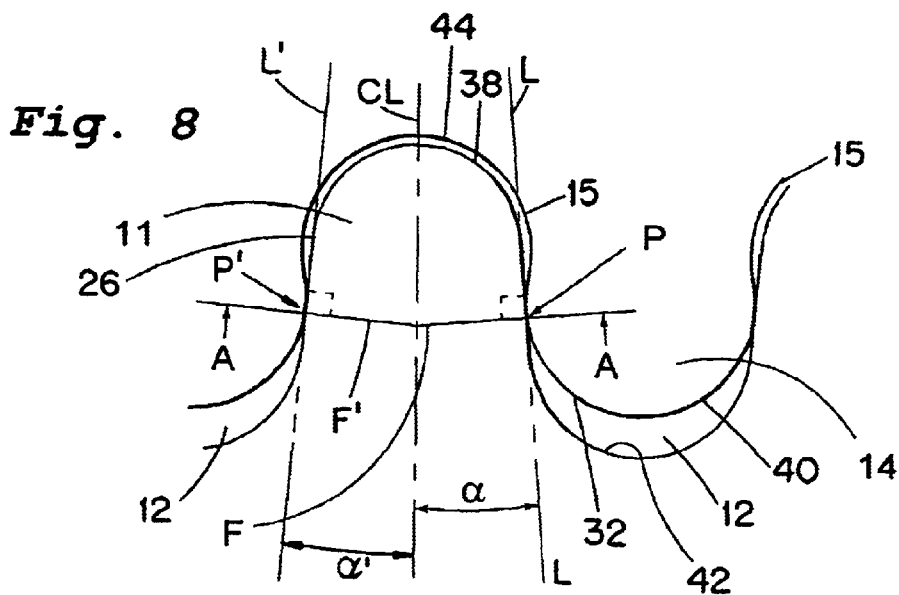
FIG. 8 shows in detail how two teeth cooperate in a tool coupling according to the present invention.

With reference to FIG. 6, each of the teeth 11 terminates axially in an axially facing wall 22 which is axially offset from the axially facing end surface 20. As can be seen in FIG. 8, each tooth 11 includes a side wall 26 extending from one adjacent recess 12 to the other adjacent recess 12. That side wall 26 also defines one-half of a sidewall of each of the two adjacent recesses 12.

Figure 3:
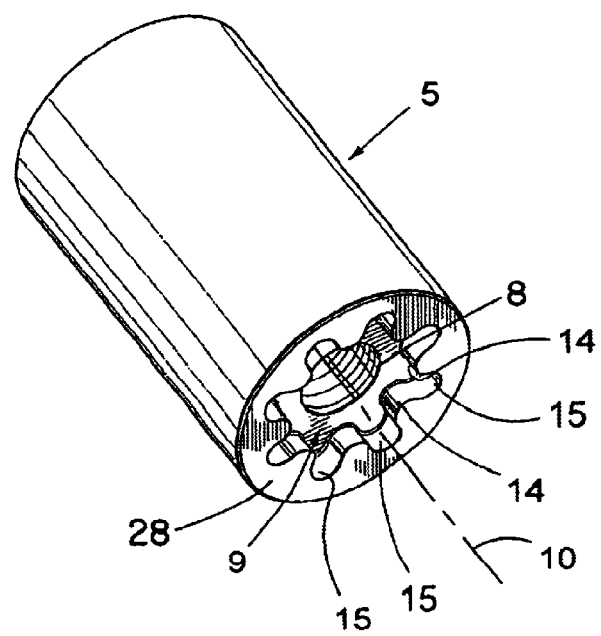
FIG. 3 shows a perspective view of a drive shaft, which is provided with a female part of the tool coupling according to the present invention.
Figure 4:
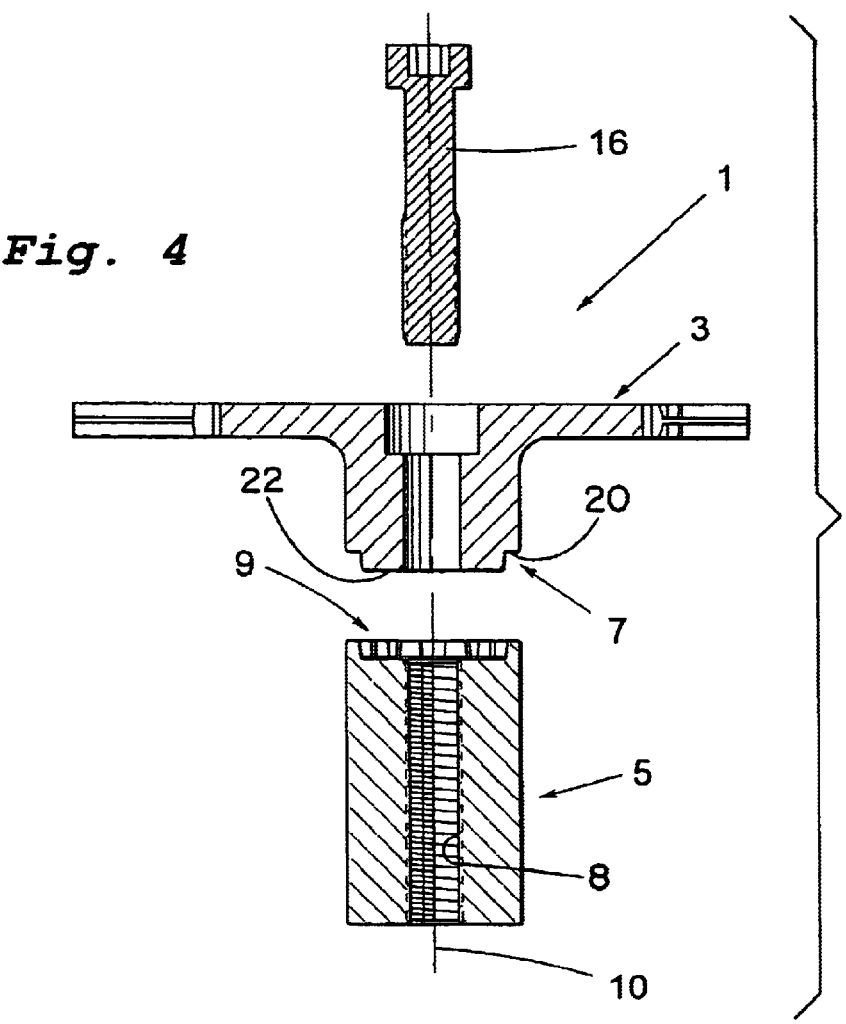
FIG. 4 shows an exploded side view of the parts included in a tool coupling according to the present invention.

The female part 9, which is most clearly seen in FIG. 3, is formed to mate with the male part 7, i.e., the male part 7 is received in the female part 9. The female part 9 is formed in an axially facing end surface 28 of the shaft 5 and comprises a number of teeth 14, which are circumferentially spaced-apart from each other. The teeth 14 form a tangent to an imaginary circle having its center lying on the axis of rotation 10, and are directed towards said axis of rotation 10. The teeth 14 are spaced-apart by a number of recesses 15, which also are spaced-apart from each other, and which form a tangent to an imaginary circle having its center lying on the axis of rotation 10, and which are open in a direction towards said axis of rotation 10. As is seen in FIG. 6 the female part 9 has a slightly conical shape as seen in the longitudinal section plane, with a conicity equaling the conicity β of the male part 7. In the center of the female part 9, a second, internally threaded, cylindrical hole 8 is recessed having its center lying on the axis of rotation 10.

With reference to FIG. 6, each of the recesses terminates axially in an axially facing wall 30 which is axially offset from the axially facing end surface 28. As can be seen in FIG. 8, each tooth 14 includes a sidewall 32 extending from one adjacent recess 15 to the other adjacent recess 15. That sidewall 32 also defines one-half of a sidewall of each of the two adjacent recesses 15.

As can be seen in FIG. 8, the sidewall of each of the teeth 11, 14 has a convex free end 38, 40 and the sidewall of each of the recesses 12, 15 has a concave bottom 42, 44. However, the shape of the teeth 11, 14 and the recesses 12, 15 can vary widely within the scope of the invention, as illustrated in FIGS. 9–13. As will become apparent, however the teeth should be shaped differently from the recesses in which they are received.

Figure 5:
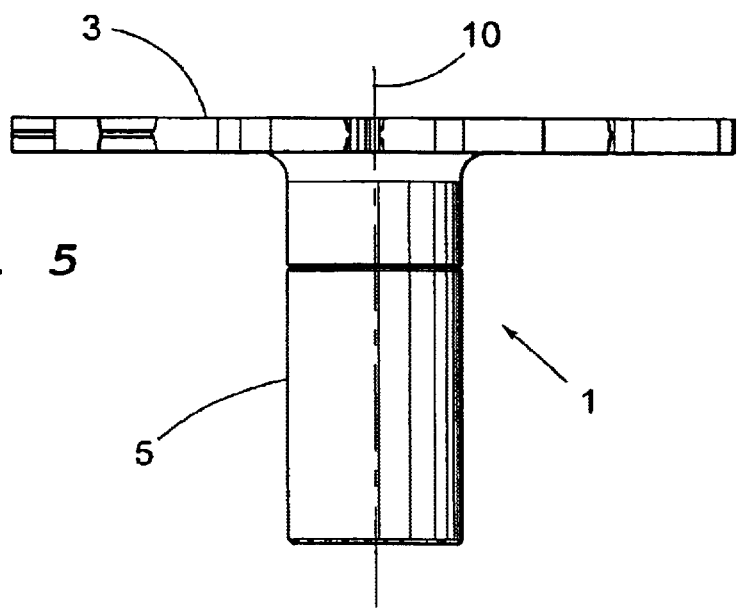
FIG. 5 shows a side view of the tool coupling according to the present invention in an assembled state.

In FIG. 5, the tool 1, i.e., the slitting cutter, is shown in an assembled state, which means that the shaft 5 and the slitting cutter body 3 are connected to each other, this connection having been achieved by means of a screw 16, which is inserted along the axis 10 to apply an axial force to the male and female parts 7, 9.

FIG. 6 shows a longitudinal section taken along a longitudinal section plane A—A in FIG. 8 through the mutual contact area between the male part 7 and the female part 9, i.e., the area at which direct abutment takes place between the respective conical surfaces. There is an axial gap R between the axially facing end surfaces 20, 28. There is a larger axial gap T between the axially facing walls 22, 30 of the axially facing walls 22, 30. This means that after additional axial displacement W of the male part 7 and the female part 9 towards each other (e.g., due to wear), the axially facing surfaces 20, 28 will come into abutment against each other, while the axially facing walls 22, 30 will not be in contact with each other. Due to the fact that such abutment takes place at the surfaces 20, 28 which, for the most part, are situated farther from the center of rotation than the walls 22, 30, an increased stability of the tool coupling (especially pertaining to bending loads) occurs than would be the case if the walls 22, 30 were to abut against each other.

Figure 7:
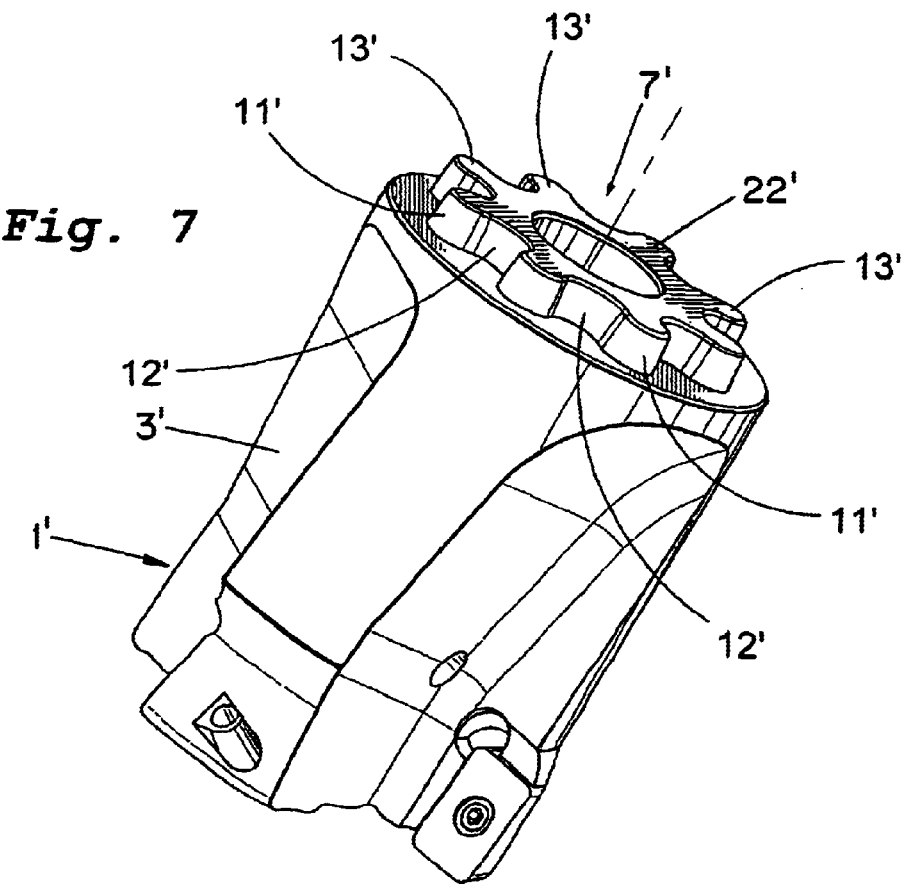
FIG. 7 shows a loose top of a milling cutter, which is provided with a male part of the tool coupling according to the present invention.

In FIG. 7, it is shown how a tool coupling according to the invention can be applied to a different type of tool. That is, a so-called loose top 3' of a tool 1' in the form of a milling cutter is shown. The loose top 3' has a male, part 7' of a tool coupling according to the present invention, said male part 7' having principally the same design as the above-described male part 7. This means that the male part 7' comprises a number of teeth 11', which are spaced-apart from each other, and which form a tangent to an imaginary circle having its center lying on the axis of rotation 10', and extending in a direction away from said axis of rotation 10'. The teeth 11' are spaced-apart by a number of recesses 12', which also are spaced-apart from each other, and which form a tangent to an imaginary circle having its center lying on the axis of rotation 10', and extending in the direction of said axis of rotation 10'. Similarly to the male part 7, the male part 7' has a slightly conical shape.

The loose top 3' is intended to be mounted on a tool body (not shown), said tool body being provided with a female part fitting to the male part 7', which female part principally has the same design as the female part 9.

In FIG. 8, a detail of a tooth 11 of the male part 7 and a tooth 14 of the female part 9 is shown (which detail is also applicable to the teeth 11' and 14' of FIG. 7). In the above-described embodiments, the female part 9 imparts a rotation to the male part 7 due to the fact that the tooth 14 of the female part 9 is in contact with the tooth 11 of the male part 7. In particular, and with reference to FIG. 8, the sidewall 26 of each driven tooth 11 has a different curvature than the sidewall 32 of the respective recess 15, whereby contact between those sidewalls 26, 32 is in the form of point-contact as the tooth 11 is viewed in a direction parallel to the axis 10 (i.e., as viewed in FIG. 8). That is, the contact occurs at two points P, P' situated on opposite sides of a line of symmetry CL of the driven tooth 11 (i.e., the tooth 11 is of identical configuration on both sides of the line of symmetry). It will be appreciated that the contact between the sidewalls 26 and 32 actually takes place along two lines, wherein the points P, P' represent the respective ends of the two lines.

During rotation in the counterclockwise direction in FIG. 8, a drive force will be transmitted from the sidewall 32 to the sidewall 26 at the contact point P, whereas rotation in the opposite direction would be transmitted from the sidewall 32 to the sidewall 26 at the contact point P'.

At each of the contact points P, P' a tangent line L can be drawn. It will be appreciated that the drive force transmitted at each contact point P, P' will be directed along a line of force F, F' oriented perpendicular to the respective tangent line L.

Furthermore, a driving angle α, α' is formed between the line of symmetry CL and the respective tangent line L (the two driving angles α, α' being equal). Importantly, the driving angle is in the range of −5° to +45°, preferably −20° to +25°.

Figure 9:
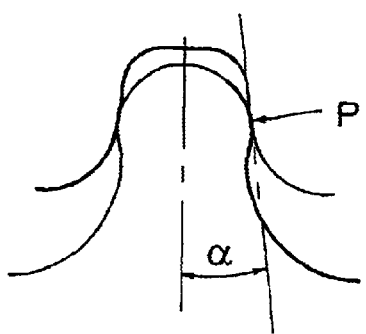
FIGS. 9–13 show additional embodiments of teeth of respective tool couplings according to the present invention.
Figure 10:
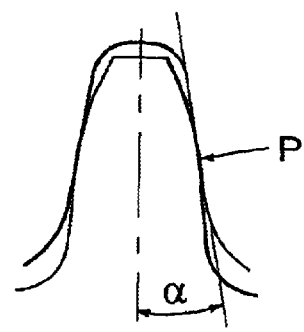
Figure 11:
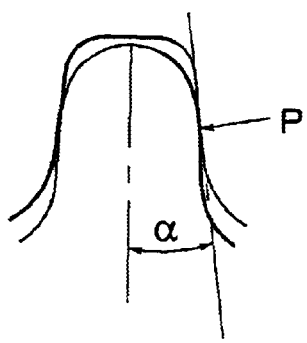
Figure 12:
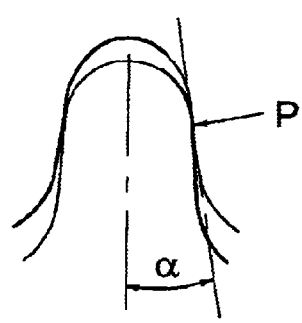
Figure 13:
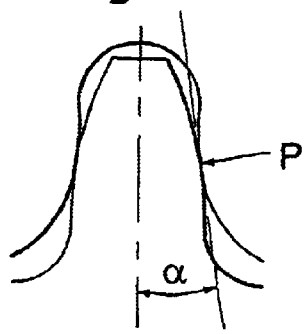

In FIGS. 9–13, the driving angles α are shown for different embodiments of teeth and cooperating recesses of the male part 7 and the female part 9 according to the present invention. As can be seen in FIGS. 8, 10 and 11, the curvature of one of the sidewalls 26, 32 at the points of contact can be zero degrees, i.e., a linear curvature. In FIG. 8, the sidewall 26 is linear, and the sidewall 32 is convex at the contact points. In FIGS. 9 and 13 each of the sidewalls 26, 32 is convex at the points of contact. In FIG. 10, the sidewall 32 is linear and the sidewall 26 is convex. In FIG. 12 the sidewall 32 is linear and the sidewall 26 is convex at the points of contact.

The number of teeth of each of the male part 7; 7' and the female part 9, should be 4–12, preferably 6–8.

As a general rule a tool coupling having a conical male and female part is especially suitable for high spindle speeds (approximately 15,000–25,000 rpm).

Feasible Modifications of the Invention

In the above-described embodiments, each of the male and female parts is formed with identical teeth around the entire circumference thereof. However, it is also feasible within the scope of the present invention that the teeth of the male part and/or the female part according to the present invention could have different designs along the circumference of the male part and/or female part, respectively. Thereby, a guiding of mutual indexing of the male part and female part can take place, i.e., they only fit together in a limited number of positions.

In the above-described embodiments, all teeth of the male part and of the female part have an equally large extent (length) from the axis of rotation 10; 10'. However, it is also feasible within the scope of the present invention that one or more teeth of either (or both) of the male and female teeth could have an extent from the axis of rotation 10; 10' different from the other teeth. This may, for instance, be the case if the tool coupling is desired to be indexed to a special position.

In the above-described embodiments, the male part 7; 7' is situated on the part of the tool which carries the cutting inserts for chip removing machining, while the female part 9 is received in the tool body/shaft proper 5. However, the reverse is also possible within the scope of the present invention, i.e., the male (driven) part 7; 7' could be situated on the tool body/shaft 5, while the female (drive) part 9 is received in the part of the tool which carries the cutting members for chip removing machining.

Above, the tool coupling according to the present invention has been described in connection with a slitting cutter and a milling cutter. However, this only constitutes examples of tools where the tool coupling according to the present invention may be applied. Additional feasible applications for the tool coupling according to the present invention are other types of mining cutters, drills with loose tops, broaches. The listing is only exemplifying.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination:
   a driven tool defining an axis of rotation and including a body having at least one seat for receiving a cutting insert;
   a drive member for driving the tool about the axis; and
   a securing element for securing the driven tool to the drive member;
   the driven tool including a driven part rotatable about the axis, and the drive member including a drive part rotatable about the axis and mated with the driven part to form a drive coupling therewith,
   the drive part and the driven part including radially open recesses and driven teeth, respectively, the teeth and recesses being conical as viewed in a longitudinal section plane containing the axis, and being arranged one inside of the other,
   the driven teeth projecting generally radially with respect to the axis and received in respective ones of the radially-open recesses formed in the conical drive part;
   each of the driven teeth terminating in an axially facing wall and including a sidewall contacting a sidewall of the recess, a curvature of the tooth sidewall being different from a curvature of the recess sidewall at locations where those sidewalls contact one another, wherein such contact is in the form of lines of contact disposed on respective sides of a generally radial line of symmetry of the respective tooth the lines of contact converging toward one another;
   each of the contact points being operable to transmit a drive force from the drive part of the driven part in a respective direction of rotation;
   each of the contact points defining a tangent line, wherein the drive force is transmitted along a line of force oriented perpendicular to a respective tangent line;
   wherein a driving angle is formed between the line of symmetry and each tangent line, each driving angle being in the range of −5° to +45°;
   wherein the securing element comprises a fastener screw extending along the axis and interconnecting the drive part and the driven part.

2. The combination according to claim 1 wherein each driving angle is from −20° to +25°.

3. The combination according to claim 1 wherein the drive part comprises a female part and the driven part comprises a male part arranged inside of the female part.

4. The combination according to claim 3 wherein the male part is disposed on the driven tool, and the female part is disposed on the drive member.

5. The combination according to claim 1 wherein the conical shape of the drive part and the driven part is defined by a cone angle of from 1° to 30°.

6. The combination according to claim 5 wherein the cone angle is from 2° to 14°.

7. The combination according to claim 1 wherein the driven teeth constitute first teeth; the drive part including circumferentially spaced generally radially extending second teeth received in respective radially open recesses of the driven part.

8. The combination according to claim 1 wherein the sidewall of each of the driven teeth includes a convexly curved tip; and the sidewall of each of the recesses in which the driven teeth are received includes a convexly curved floor disposed radially opposite the convexly curved tip of the respective driven tooth.

9. In combination:
- a driven tool defining an axis of rotation and including a body having at least one seat for receiving a cutting insert;
- a drive member for driving the tool about the axis; and
- a securing element for securing the driven tool to the drive member;
- the driven tool including a driven part rotatable about the axis, and the drive member including a drive part rotatable about the axis and mated with the driven part to form a drive coupling therewith,
- the drive part and the driven part being conical as viewed in a longitudinal section plane containing the axis, and being arranged one inside of the other,
- the driven part including driven teeth projecting generally radially with respect to the axis and received in respective radially-open recesses formed in the drive part;
- each of the driven teeth terminating in an axially facing wall and including a sidewall contacting a sidewall of the recess, a curvature of the tooth sidewall being different from a curvature of the recess sidewall at locations where those sidewalls contact one another, wherein such contact is in the form of a point contact on each side of a generally radial line of symmetry of the respective tooth as viewed in a direction parallel to the axis;
- each of the contact points being operable to transmit a drive force from the drive part of the driven part in a respective direction of rotation;
- each of the contact points defining a tangent line, wherein the drive force is transmitted along a line of force oriented perpendicular to a respective tangent line;
- wherein a driving angle is formed between the line of symmetry and each tangent line, each driving angle being in the range of −5° to +45°;
- wherein the driven teeth project from a first axially facing surface of the driven tool; the recesses being formed in a second axially facing surface of the drive member; the first and second axially facing surfaces opposing one another and spaced apart axially to form a first axial gap; each of the teeth terminating axially in a first axially facing wall; each of the recesses terminating in a second axially facing wall; the first axially facing walls opposing respective second axially facing walls and spaced therefrom to form respective second axial gaps larger than the first axial gap.

* * * * *